US00RE39386E

(19) United States
(12) Reissued Patent
Shin

(10) Patent Number: US RE39,386 E
(45) Date of Reissued Patent: Nov. 14, 2006

(54) CONTAINER

(75) Inventor: Hyun-Woo Shin, Seoul (KR)

(73) Assignee: Oxy Co., Ltd., Seoul (KR)

(21) Appl. No.: 29/159,009

(22) Filed: Mar. 15, 2002

Related U.S. Patent Documents

Reissue of:
(64) Patent No.: Des. 448,464
Issued: Sep. 25, 2001
Appl. No.: 29/130,276
Filed: Sep. 29, 2000

(51) LOC (8) Cl. ..... 23-04
(52) U.S. Cl. ..... D9/529
(58) Field of Classification Search ..... D9/729, D9/728, 338, 550; 220/796; 206/204; D23/366–369
See application file for complete search history.

(56) References Cited

U.S. PATENT DOCUMENTS

D323,383 S * 1/1992 Keays et al. ..... D23/366
D414,689 S * 10/1999 Ruello ..... D9/338
D439,647 S * 3/2001 Audebourg ..... D23/366
D455,647 S * 4/2002 Cummings ..... D9/338

* cited by examiner

*Primary Examiner*—Lisa Lichtenstein
(74) *Attorney, Agent, or Firm*—Howard & Howard

(57) CLAIM

An ornamental design for a [dehumidifying agent] container, as shown and described.

DESCRIPTION

FIG. 1 is a perspective view of a container [for a dehumidifying agent];
FIG. 2 is a front elevational view thereof;
FIG. 3 is a rear elevational view thereof;
FIG. 4 is a side elevational view thereof;
FIG. 5 is a side elevational view thereof of the side opposite to that shown in FIG. 4;
FIG. 6 is a top plan view thereof; and,
FIG. 7 is a bottom plan view thereof.

1 Claim, 3 Drawing Sheets

Figure 1:
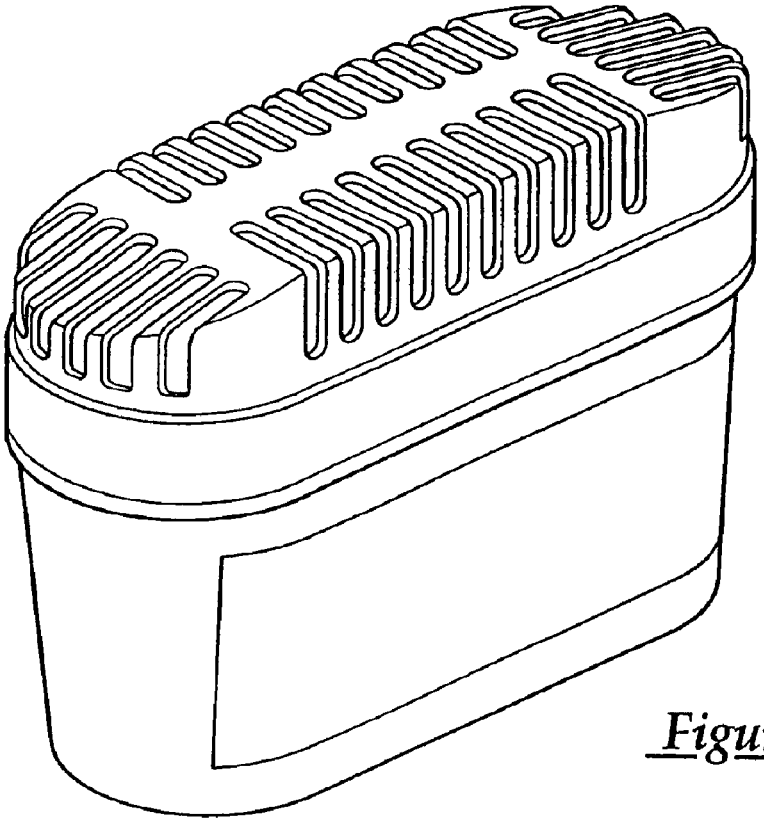
Figure 2:
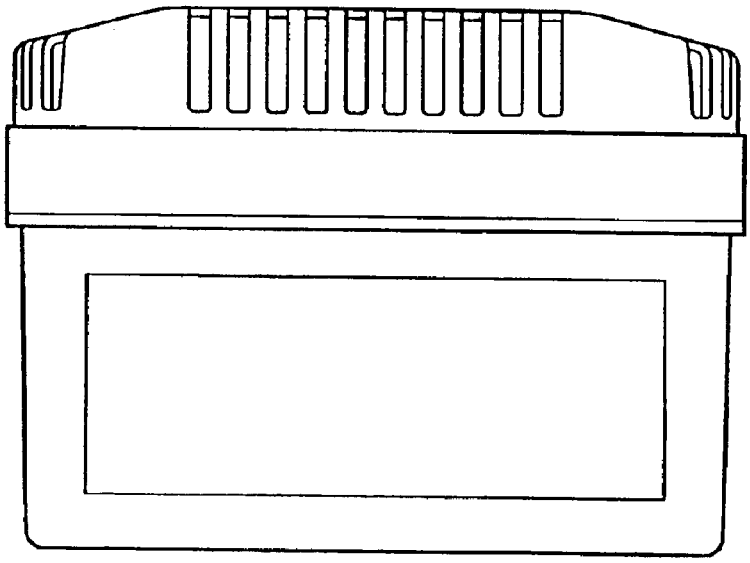
Figure 3:
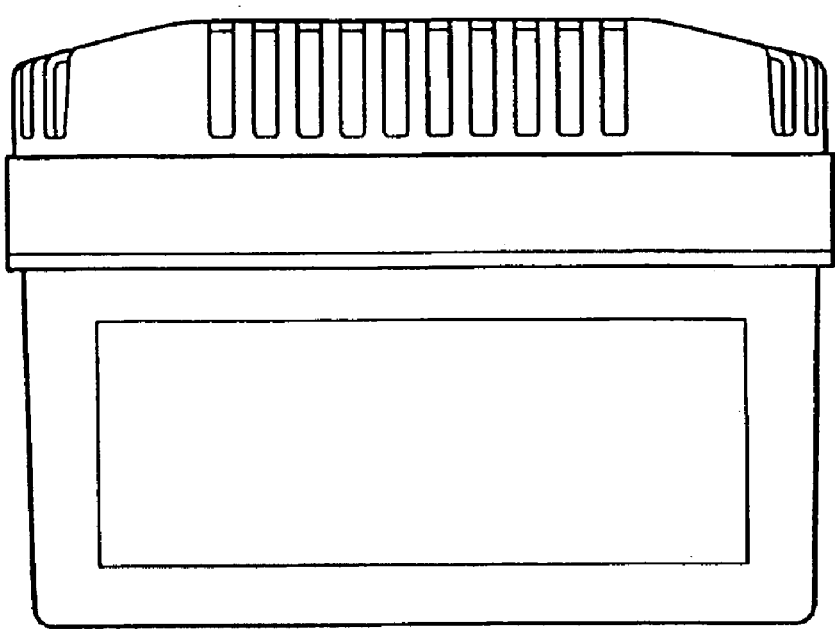
Figure 4:
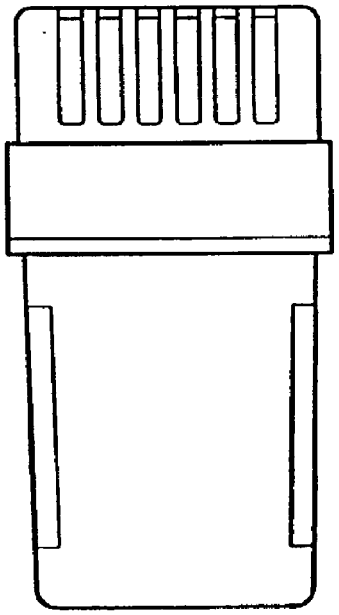
Figure 5:
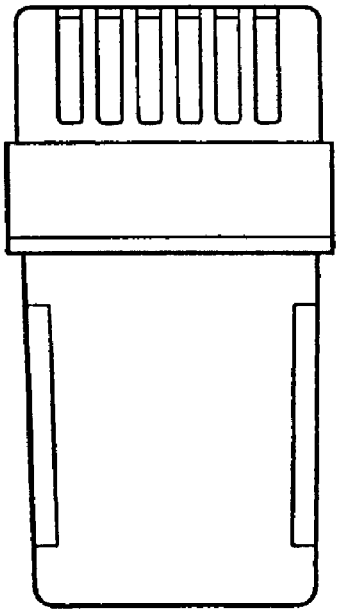
Figure 6:
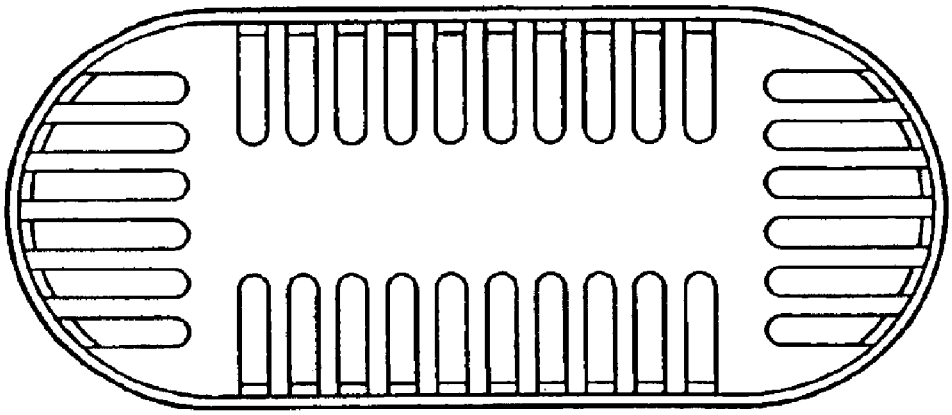
Figure 7:
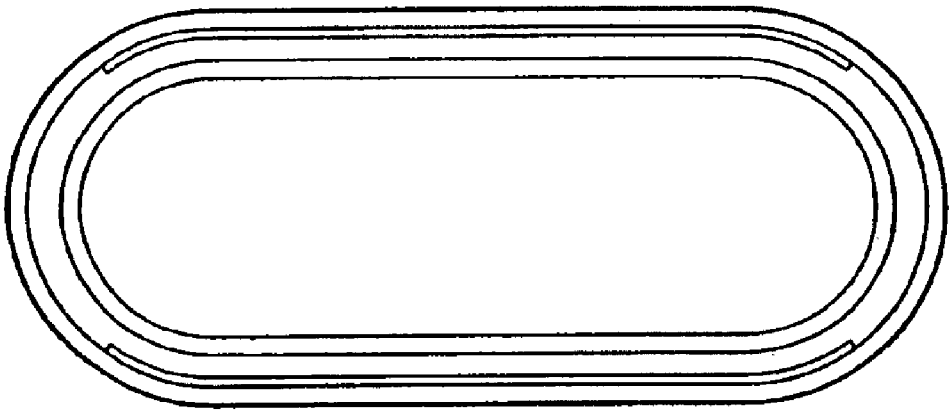

Matter enclosed in heavy brackets [ ] appears in the original patent, but forms no part of this reissue; matter printed in italics indicates the additions made by reissue.